US000001959H

(19) United States

(12) Statutory Invention Registration

Kikel

(10) Reg. No.: US H1959 H

(43) Published: May 1, 2001

(54) SINGLE BALANCED TO DUAL UNBALANCED TRANSFORMER

(76) Inventor: Anthony Kikel, 120 Scenic Dr., Madison, AL (US) 35758

(21) Appl. No.: 09/146,663

(22) Filed: Sep. 3, 1998

(51) Int. Cl.[7] ..... G01S 13/08

(52) U.S. Cl. ..... 342/51; 343/859; 333/26; 333/125

(58) Field of Search ..... 333/124, 125, 333/136, 25, 26; 343/859; 342/372

(56) References Cited

U.S. PATENT DOCUMENTS

| | | | | |
|---|---|---|---|---|
| 1,952,411 | * | 3/1934 | Böhm et al. | 333/124 X |
| 2,391,880 | * | 1/1946 | Chesus | 333/125 X |
| 3,375,511 | * | 3/1968 | Trimble et al. | 333/117 X |
| 4,800,393 | | 1/1989 | Edward et al. | 343/821 |
| 5,121,090 | * | 6/1992 | Garuts et al. | 333/124 |
| 5,189,434 | | 2/1993 | Bell | 343/853 |
| 5,264,860 | * | 11/1993 | Quan | 343/859 X |
| 5,313,218 | | 5/1994 | Busking | 343/727 |
| 5,357,223 | | 10/1994 | Forgeot | 333/26 |
| 5,565,881 | | 10/1996 | Phillips et al. | 343/859 |
| 5,594,393 | | 1/1997 | Bischof | 333/26 |
| 5,628,057 | | 5/1997 | Phillips et al. | 455/89 |
| 5,697,088 | | 12/1997 | Gu | 455/307 |
| 5,705,960 | | 1/1998 | Izumiyama | 333/26 |

FOREIGN PATENT DOCUMENTS 60-64531 4/1985 (JP) .

* cited by examiner

*Primary Examiner*—Harold J. Tudor

(57) ABSTRACT

A single balanced to dual unbalanced transformer containing within it two quarter wave transformers and seven matching network impedances. The quarter wave transformers are of common ground reference, feed a balanced output, and are coupled to and fed by two unbalanced feeds. The single balanced to dual unbalanced transformer may also contain within it a variable impedance transmission line, a power amplifier, and a low noise amplifier. The single balanced to dual unbalanced transformer provides transmit/receive paths to a passive radiator load by utilizing dynamic impedances presented by the power amplifier, the low noise amplifier, a switch, or a variable impedance transmission line that makes the active radiator concept feasible and is a new concept For solid state phased array radars and communication systems that reduces losses, improves efficiency, and ultimately reduces cost.

1 Claim, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SINGLE BALANCED TO DUAL UNBALANCED TRANSFORMER

BACKGROUND OF THE INVENTION

1. Field of the Invention

The present invention relates to commercial and military applications of microwave circuits related to solid state radar and communication applications.

2. Description of the Related Art

Solid state communication and radars utilize active components and passive radiators to transmit and receive radio frequency signals. Radars use active components and passive radiators to transmit and receive object returns. The special class of radars utilizing phased array antennas is of special interest because of their multi-functionality. These radars provide electronic special scanning capability which far out performs fixed or mechanically steered antennas.

Originally these phased array antennas utilized travelling wave tube technology with a single traveling wave tube that amplified the microwave radar signal before sending it to a power divider which fed several thousand ferrite phase shifters. These ferrite phase shifters provided the electronic steering capability to the antenna (FIG. 1). Another signal path partially common to the transmit path received the return signal and routed it to a low noise amplifier. The losses on the transmit path and the receive path significantly reduced radar energy on target and return detection. These losses were overcome by larger, more expensive, traveling wave tubes which significantly decreased the radar efficiency. A solid state architecture followed that removed a large portion of these losses from phased array radar front ends.

With the invention and development of key technologies (e.g. gallium arsenide, monolithic microwave integrated circuits, and advanced manufacturing technology) a new architecture emerged that revolutionized phased array radar antennas. This architecture utilized transmit/receive modules that contained transmit power-amplifiers which replaced the traveling wave tube and the low noise amplifier (FIG. 2). The power amplifier and the low noise amplifier, considered the active components, were placed within several inches of the radar antenna face. This approach was very attractive because it eliminated a significant portion of the RF/microwave losses that were inefficient and increased cost.

The transmit/receive module contains a solid state microwave monolithic amplifier which transmits and receives through a circulator, connectors, and a passive radiating element. This architecture is a great improvement over the traveling wave tube architecture, but with remaining losses, approximately one half of the power is still lost on transmit and the noise is approximately doubled on receive. The need for improvement is obvious, but the transmit and receive architecture drove the requirement for all of these components between the free space and the active components. Another inefficiency was created by the requirement to transform the device impedances to fifty ohms and then up to several hundred ohms at the radiator. A low loss transmit/receive impedance transformer which reactively matches the device impedances to free space is needed.

The logical approach for the next major stage of radar performance improvement is the active radiator. The active radiator was originally conceived by the government and incorporates active devices in the radiator hardware and eliminates the most significant lossy components. This approach:

(1) eliminates front end RF and microwave signal losses;

(2) reduces hardware complexity; (3) reduces cost; and (4) increases radar performance.

The related art is represented by the following patents of interest.

U.S. Pat. No. 4,800,393, issued on Jan. 24, 1989 to Brian J. Edward et al., describes a microstrip fed printed dipole with an integral balun and a 180 degree phase shift bit. Edward et al. do not suggest a single balanced to dual unbalanced transformer according to the claimed invention.

U.S. Pat. No. 5,189,434, issued on Feb. 23, 1993 to Ross L. Bell, describes a multi-mode antenna system having plural radiators coupled via hybrid circuit modules. Bell does not suggest a single balanced to dual unbalanced transformer according to the claimed invention.

U.S. Pat. No. 5,313,218, issued on May 17, 1994 to Erik B. Busking, describes an antenna assembly. Busking does not suggest a single balanced to dual unbalanced transformer according to the claimed invention.

U.S. Pat. No. 5,357,223, issued on Oct. 18, 1994 to Olivier Forgeot, describes a connection device between an antenna and a microelectronic enclosure. Forgeot does not suggest a single balanced to dual unbalanced transformer according to the claimed invention.

U.S. Pat. No. 5,565,881, issued on Oct. 15, 1996 to James P. Phillips et al., describes a balun apparatus including impedance transformer having transformation length. Phillips et al. '881 does not suggest a single balanced to dual unbalanced transformer according to the claimed invention.

U.S. Pat. No. 5,594,393, issued on Jan. 14, 1997 to Werner Bischof, describes a microwave line structure. Bischof does not suggest a single balanced to dual unbalanced transformer according to the claimed invention.

U.S. Pat. No. 5,628,057, issued on May 6, 1997 to James P. Phillips et al., describes a multi-port radio frequency signal transformation network. Phillips et al. '057 does not suggest a single balanced to dual unbalanced transformer according to the claimed invention.

U.S. Pat. No. 5,697,088, issued on Dec. 9, 1997 to Wang-Chang Albert Gu, describes a balun transformer. Gu does not suggest a single balanced to dual unbalanced transformer according to the claimed invention.

U.S. Pat. No. 5,705,960, issued on Jan. 6, 1998 to Toru Izumiyama, describes a balanced-to-unbalanced converting circuit. Izumiyama does not suggest a single balanced to dual unbalanced transformer according to the claimed invention.

Japan Patent document 60-64531, published on Apr. 13, 1985, describes an antenna matching unit. Japan '531 does not suggest a single balanced to dual unbalanced transformer according to the claimed invention.

None of the above inventions and patents, taken either singularly or in combination, is seen to describe the instant invention as claimed.

SUMMARY OF THE INVENTION

The present invention is a single balanced to dual unbalanced transformer containing within it two quarter wave transformers and seven matching network impedances. The quarter wave transformers are of common ground reference, feed a balanced output, and are coupled to and fed by two unbalanced feeds. The single balanced to dual unbalanced transformer may also contain within it a variable impedance transmission line, a power amplifier, and a low noise amplifier. The single balanced to dual unbalanced transformer provides transmit/receive paths to a passive radiator load by utilizing dynamic impedances presented by the power amplifier and the low noise amplifier that makes the active radiator concept feasible and is a new concept for solid state phased array radars or communication systems that reduces losses, improves efficiency, and ultimately reduces cost. The conventional transmit/receive module requires front-end hardware between the radiator and free space. If polarization diversity is required, the hardware and the losses are significant with the conventional transmit/receive architecture. The typical transmit/receive module may require two microwave monolithic integrated circuit power amplifiers to radiate the required power. Since losses between the active devices and free space account for approximately one half of the power lost, the additional microwave monolithic integrated circuit power amplifiers are required simply to provide the additional power to recover this loss.

The single balanced to dual unbalanced transformer design is very flexible and lends itself well to either narrow band or to octave wide large solid state arrays that require high sensitivity. The single balanced to dual unbalanced transformer technology is highly producible and should significantly improve the element cost by greatly simplifying the conventional transmit/receive module configuration.

The single balanced to dual unbalanced transformer directly transforms the active device impedance to the free space impedance while maintaining transmit/receive functionality. The single balanced to dual unbalanced transformer uniquely applies existing technologies and eliminates unnecessary hardware in the loss path between free space and the active devices (power amplifier and low noise amplifier) and significantly improves the system parameters and ultimately the cost.

The single balanced to dual unbalanced transformer allows hardware to be easily reconfigured to add a second channel without additional loss in the front end to provide simultaneous polarization diversity from cross polarized linear to circular, including elliptical. Two separate modified balun feeds are used in electrical quadrature with appropriate phase to provide cross polarized linear, left or right circular, or elliptical polarizations.

The single balanced to dual unbalanced transformer uses two coupled lines instead of a single line and therefore provides both transmit and receive capability through a fundamental impedance transforming network.

The microwave monolithic integrated circuit or any active components determine the transmit or receive modes depending upon which is activated. An "off" device with a variable impedance transmission line between the device and the balun presents a ground (or low impedance) to the circuit. The other device would be "on" and impedance matched to the balun input. This modified dual line Marchand balun makes the new single balanced to dual unbalanced transformer architecture possible. The balanced line output from the balun can feed any balanced passive radiator dipole.

Accordingly, it is a principal object of the invention to provide a single balanced to dual unbalanced transformer containing within it seven matching network impedances and two quarter wave transformers of common ground reference that feed a balanced output and are coupled to and fed by two unbalanced feeds.

It is another object of the invention to provide a single balanced to dual unbalanced transformer which also contains within it two quarter wave transformers of common ground reference that feed a balanced output that are coupled to and fed by two unbalanced feeds, seven matching network impedances, variable impedance transmission line, power amplifier, and low noise amplifier.

It is a further object of the invention to provide a single balanced to dual unbalanced transformer which provides transmit/receive paths to a passive radiator load by utilizing dynamic impedances presented by a power amplifier and a low noise amplifier.

It is an object of the invention to provide improved elements and arrangements thereof a single balanced to dual unbalanced transformer for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
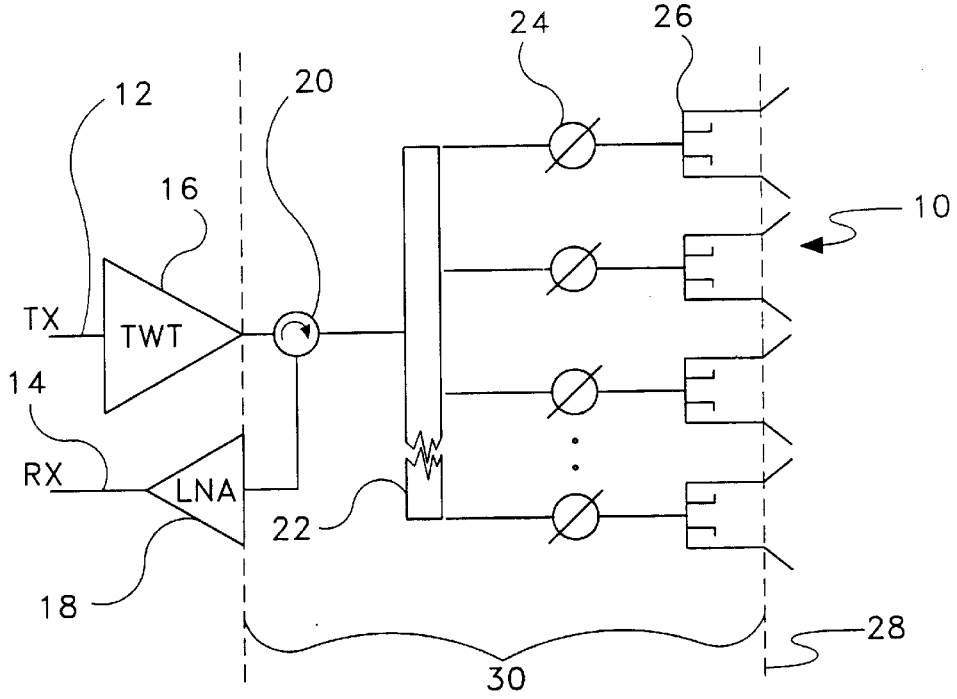
Fig. 1 (PRIOR ART)
FIG. 1 is a schematic of a prior art traveling wave tube phased array radar antenna.

The present invention is a single balanced to dual unbalanced transformer. The original traveling wave tube phased array radar 10 antenna is shown in FIG. 1. This figure and the next figure. (FIG. 2) are presented to show the progression in phased array architecture over the last thirty years in an effort to reduce front-end RF/microwave losses to improve radar antenna performance. A transmitted signal travels through a transmit path (TX)12 and traveling wave tube (TWT) power amplifier 16 where it is amplified. The signal encounters front end 30 losses through a circulator 20, a power divider/combiner 22, ferrite phase shifters 24, and radiating elements 26 in antenna face 28. The received signal is amplified in a low noise amplifier (LNA) 18 and travels through a receive path (RX)14.

Figure 2:
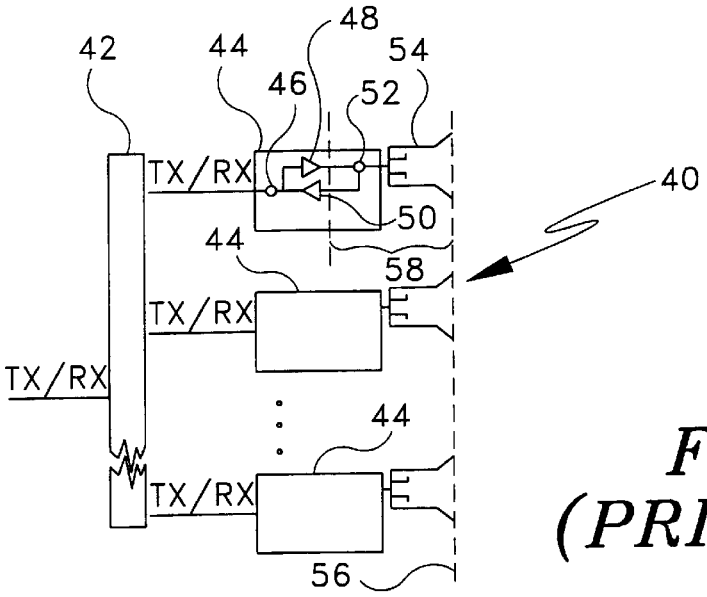
Fig. 2 (PRIOR ART)
FIG. 2 is a schematic of a prior art solid state phased array radar antenna.

Solid state radars, 40 as shown in FIG. 2, provide an improved architecture over traveling wave tube radars (FIG. 1). In FIG. 2, TX/RX is the transmit/receive path . 42 is a power divider/combiner. 44 is a transmit receive module. 46 is a ferrite phase shifter. 48 is a power amplifier. 50 is a low noise amplifier. 52 is a circulator. 54 is a radiating element. 56 is the antenna face. One of the most significant improvements and the one important for this disclosure is the significant reduction in front end losses 58. This architecture has technical challenges, but the radar antenna performance is greatly enhanced and costs are reduced. Years of technology development occurred before this architecture could be implemented. The new single balanced to dual unbalanced transformer makes the next major performance progression possible today and is shown in schematic form in FIG. 3.

Figure 3:
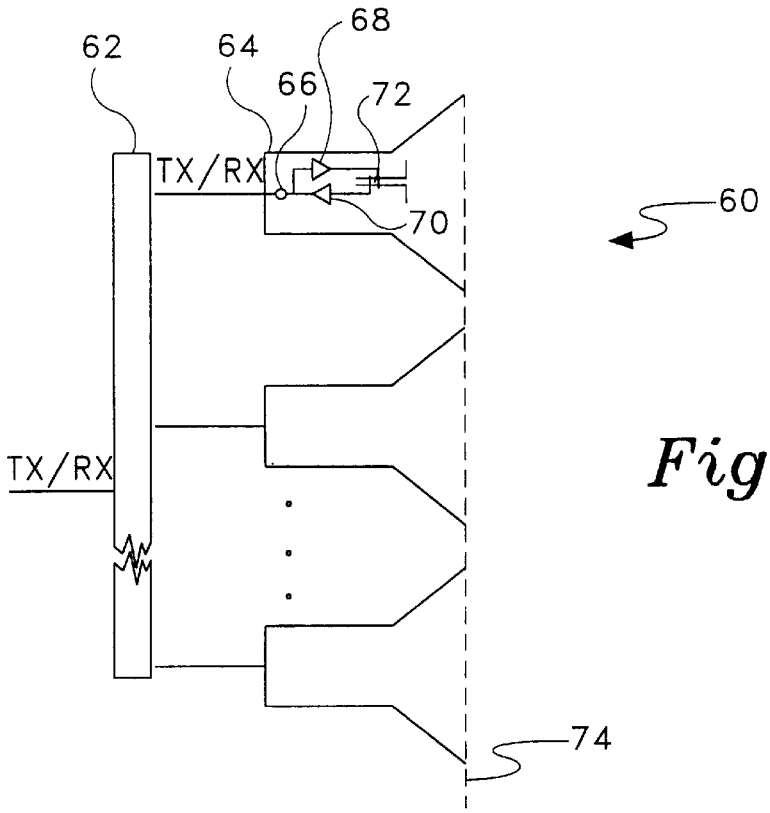
FIG. 3 is a schematic of a single balanced to dual unbalanced transformer according to the present invention.

The single balanced to dual unbalanced transformer, as shown in radar 60 of FIG. 3, shows the active components contained within the radiator hardware 64 which is made possible by the single balanced to dual unbalanced transformer 72. The single balanced to dual unbalanced transformer 72 provides transmit/receive selection while transforming the impedance of the devices 68, 70 to the free space impedance at the antenna face 74. This single balanced to dual unbalanced transformer 72 is the central disclosure item. The radiator hardware 64 contains within it two quarter wave transformers and seven matching network impedances. The quarter wave transformers are of common ground reference, feed a balanced output, and are coupled to and fed by two unbalanced feeds. The radiator hardware 64 may also contain within it a variable impedance transmission line, a power amplifier 68, and a low noise amplifier 70. In FIG. 3, TX/RX is the transmit/receive path. 62 is the power divider/combiner. 66 is a ferrite phase shifter.

Figure 4:
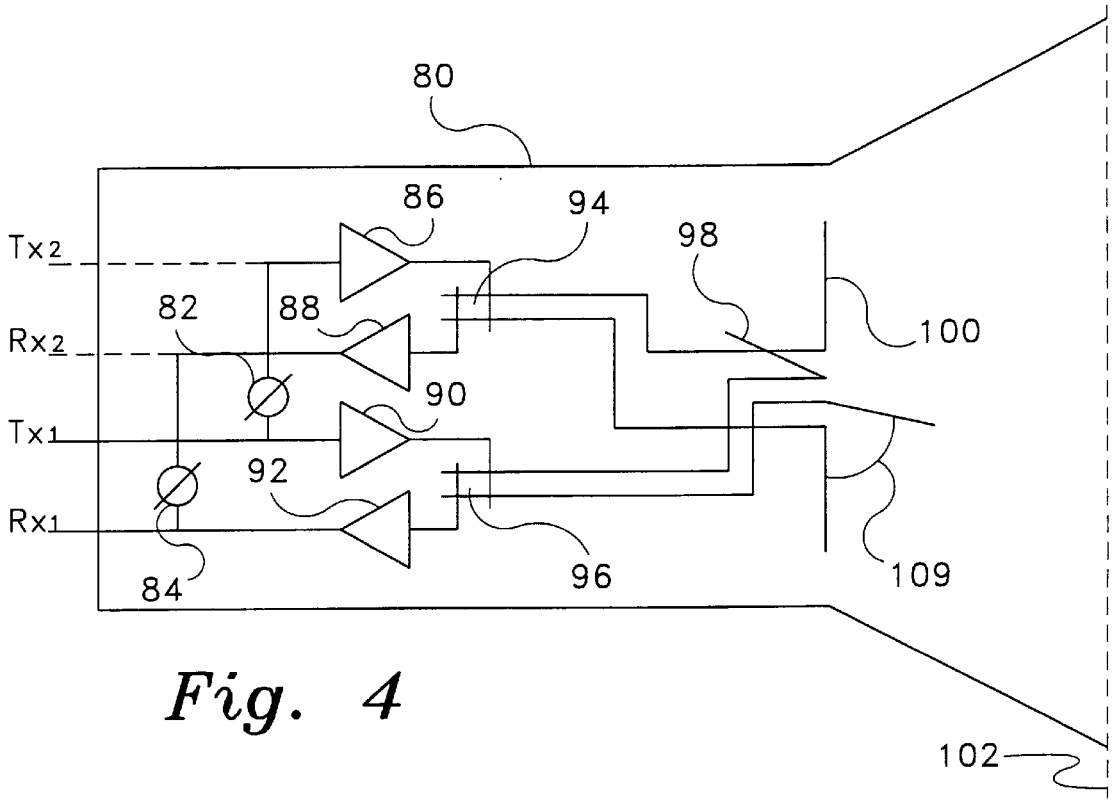
FIG. 4 is a schematic of a two channel single balanced to dual unbalanced transformer according to the present invention.

A schematic of a two channel single balanced to dual unbalanced transformer which relates to single balanced to dual unbalanced transformers is shown in radar 80 of FIG. 4. This single balanced to dual unbalanced transformer architecture is capable of providing simultaneous right and left circular, cross polarized linear, and elliptical polarizations without any additional losses. Currently, there is no other configuration that can provide this capability with these low losses. This circuit provides any polarization by changing the phase shifters 82, 84. If phase shifters 82,84 are set so that the relative phase between the upper channel is +90 with respect to the lower channel, left hand circular polarized fields will be transmitted and received. If phase shifters 82,84 are set so that the relative phase between the upper channel is −90 with respect to the lower channel, right hand circular polarized fields will be transmitted and received. If the relative phase between the channels is 0 degrees, cross polarized linear can be received and transmitted. Any other relative phase between the channels will result in elliptical polarization.

For simultaneous right and left polarizations or simultaneous cross polarized linear capability, phase shifters 82, 84 may be removed and replaced with open circuits, and TXs and RXs (dashed lines) are included. This configuration can supply simultaneous polarization to the signal processor of the radar. In FIG. 4, Tx1 and Tx2 are the transmit paths. 86 and 90 are power amplifiers. 88 and 92 are low noise amplifiers. 94 and 96 are active radiator matching networks. 98 and 100 are simple dipole representations. 109 denotes a rotation of 90 degrees, 102 is the antenna face. Rx1 and Rx2 are the receive paths.

Figure 5:
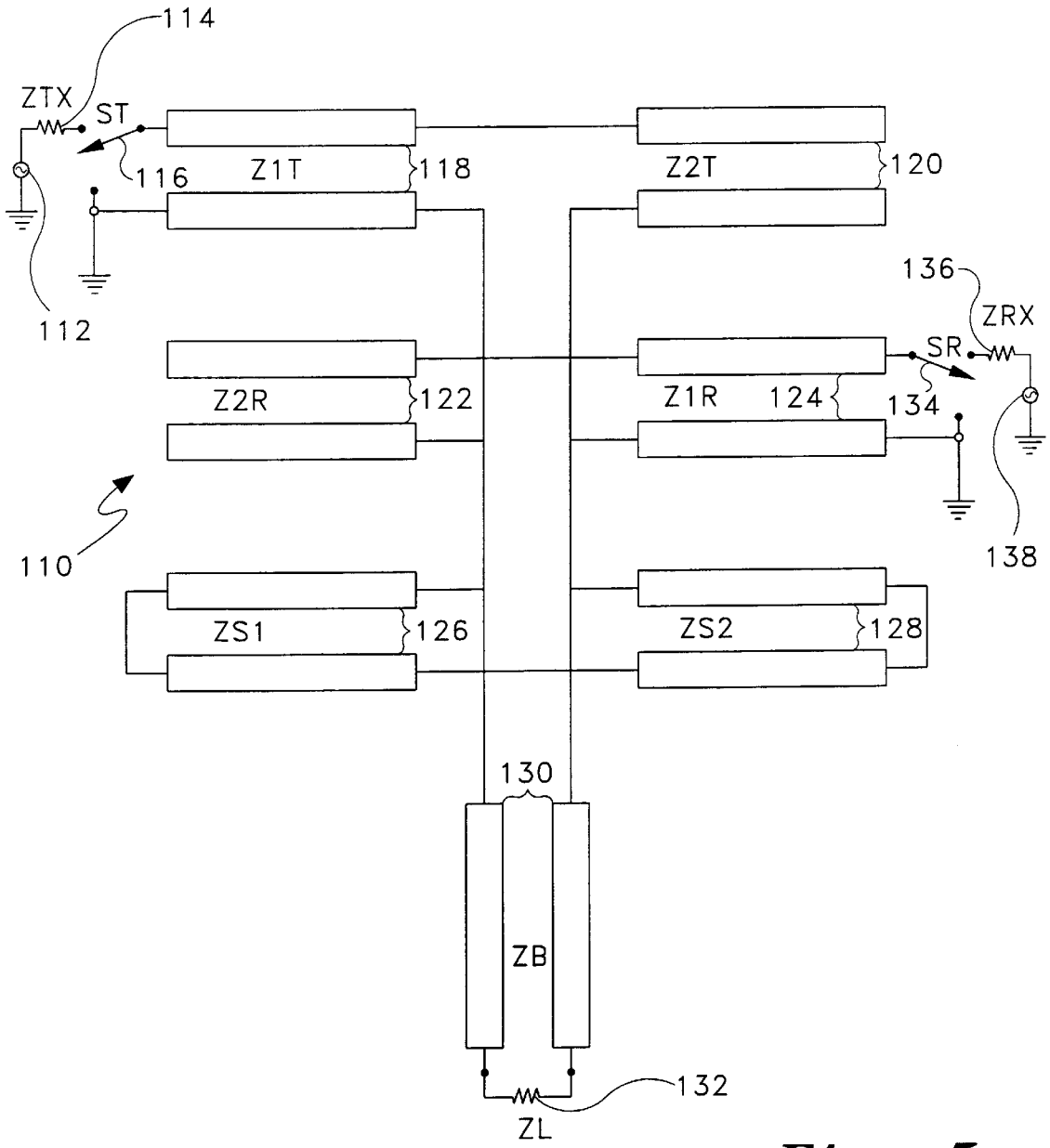
FIG. 5 is a detailed schematic of the single balanced to dual unbalanced transformer according to the present invention.

FIG. 5 is a detailed schematic of the single balanced to dual unbalanced transformer 110. This circuit provides transmit/receive paths to the passive radiator load ZL 132 by utilizing the dynamic impedance ZTX 114 presented by the power amplifier 112 and the dynamic impedance ZRX 136 presented by the low noise amplifier 138. ST 116 and SR 134 may not be physical switches but may be a representation of "on" and "off" states of the amplifiers or of the variable impedance transmission line of FIG. 7. The switches ST 116 and SR 134 represent either an "on" or "off" device (the power amplifier 68 or low noise amplifier 70 of FIG. 3) by either being connected to ground for "off" or the load for "on". No case can occur when both devices (68 and 72 of FIG. 3) are "on" at the same time. The single balanced to dual unbalanced transformer 110 operates correctly when one device presents an RF ground to the one port 116 (e.g. at load ZTX) and the other device is on connected to the other port 134 ( e.g. at load ZRX) . The reversed state also prevents proper operation. The single balanced to dual unbalanced transformer also operates properly when both devices (68 and 72 of FIG. 3) are "off" and present RF grounds to both ports (116 and 134). Z1T 118, Z2T 120, Z2R 122, and Z1R 124 are the respective unbalanced feed impedances; and ZS1 126 and ZS2 128 are the respective quarter wave balanced output impedances all of which can be realized with many types of circuit components. ZB 130 is the load impedance.

During transmit the power amplifier 112 is "on" represented by switch ST 116 switched to ZTX 114 and the low noise amplifier is "off" represented by switch SR 134 switched to ground. This circuit requires the low noise amplifier 138 to present a low impedance at the balun by either a switch, a variable impedance transmission line, or a transformer when in the "off" state. The transmit signal of the power amplifier 112 (source impedance ZTX) is coupled into the coupled line impedances Z1T 118 and Z2T 120. The coupled line impedances Z1T 118 and Z2T 120 do not couple any energy off because of SR set to ground and the lines are quarter wavelength long which in turn presents a high impedance at the balanced line of impedance ZB 130. The transmitted signal is delivered to the load ZL 132 through the balanced line ZB 130.

During receive the low noise amplifier 138 is "on" represented by switch SR 134 switched to ZRX 136 and the power amplifier is "off" represented by switch ST 116 switched to ground. This circuit requires the power amplifier 112 to present a low impedance at the balun by either a switch, a variable impedance transmission line, or a transformer when in the "off" state. The received signal is delivered from the load ZL 132 through the balanced line ZB 130 to coupled lines with impedance Z2R 122 and Z1R 124. The coupled line with impedances Z1T 118 and Z2T 120 do not couple any energy off because ST 116 is set to ground and the lines are a quarter wavelength long which in turn presents a high impedance at the balanced line of impedance ZB 130. The received signal is delivered to the load impedance ZRX 136 by coupled lines with impedances Z2R 122 and Z1R 124.

Figure 6:
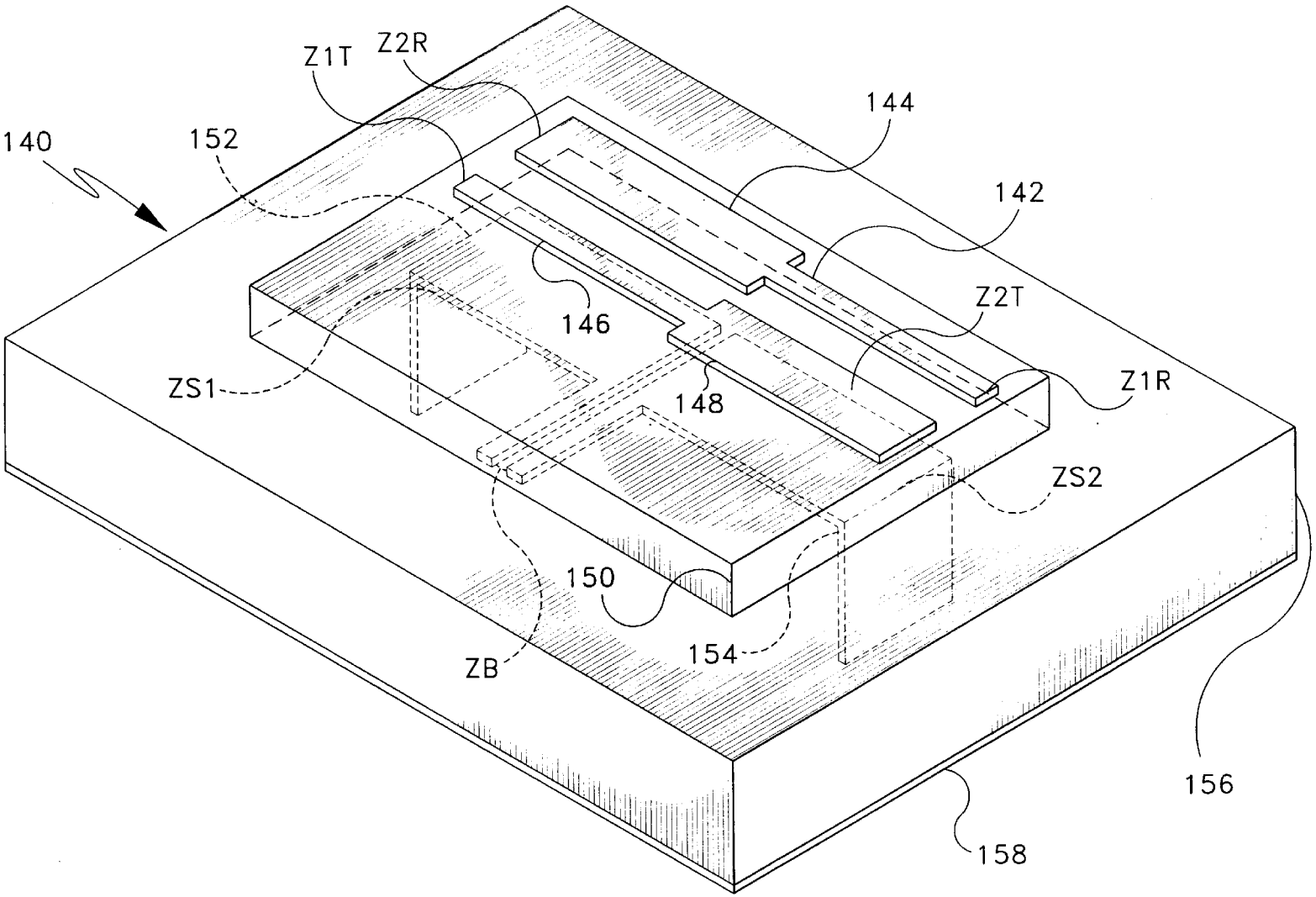
FIG. 6 is a single balanced to dual unbalanced transformer structure according to the present invention which is realized with broadside coupled microstrip, a ground plane and two dielectrics.

One realization of the single balanced to dual unbalanced transformer 110 is shown in FIG. 6. This structure 140 is realized with broadside coupled microstrip, a ground plane 158 and two dielectrics 150,156. This is a very typical manufacturing process used in microwave circuits today and implementation of circuits like this have been done. The exception is the addition of a second coupled transmission line that provides a second path for the transmit receive function. 142 is impedance Z1R. 144 is impedance Z2R. 146 is impedance Z1T. 148 is impedance Z2T. 152 is impedance ZS1. 154 is impedance ZS2.

Figure 7:
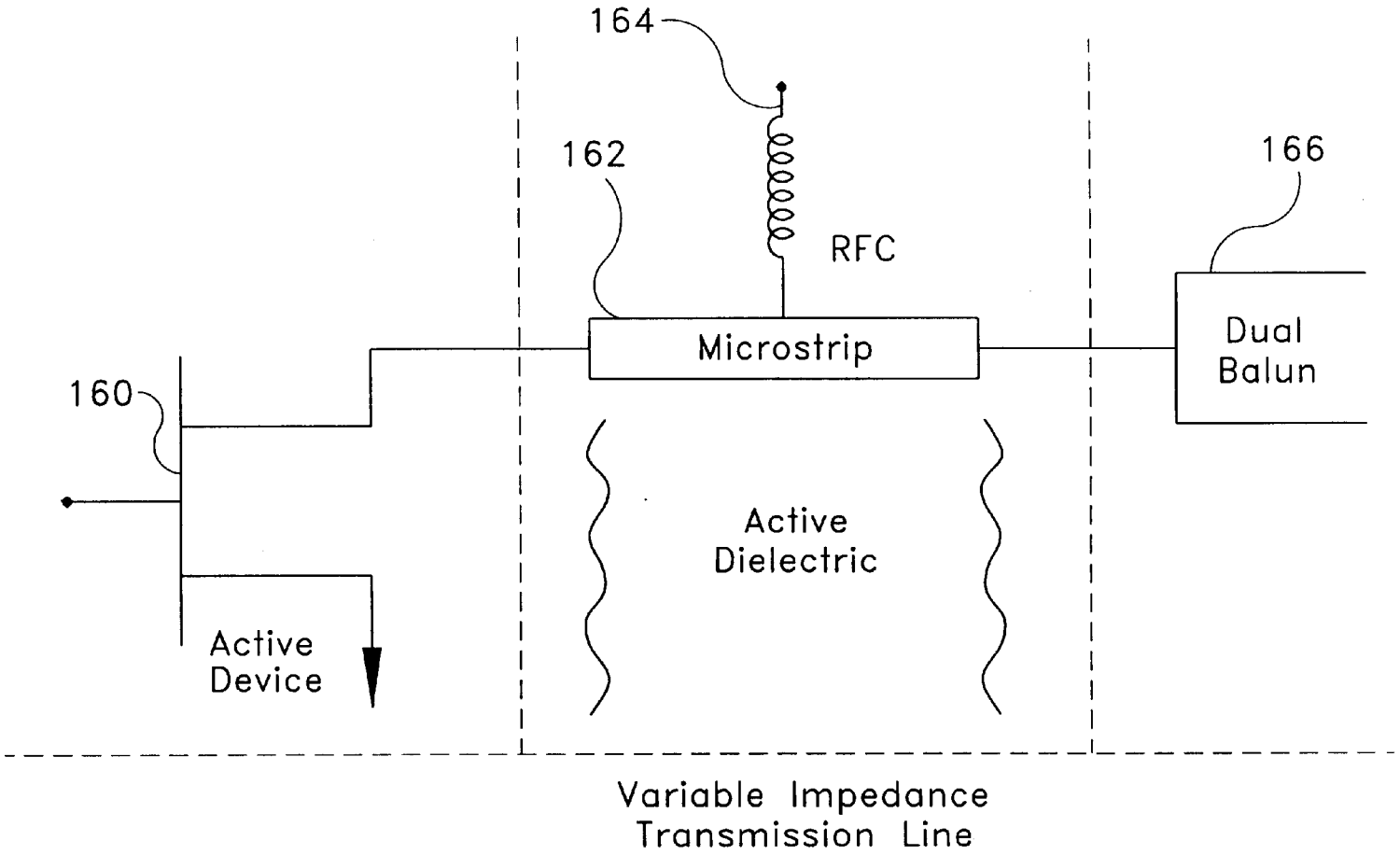
FIG. 7 is a diagram of a variable impedance transmission line.

The active device on or off state must present the proper termination impedance to the single balanced to dual unbalanced transformer for transmit/receive control. FIG. 7 shows a variable impedance transmission line that is miscrostrip 162 on active material (e.g. gallium arsenide, gallium nitride, silicon, etc.). This variable impedance transmission line may be used to present the proper "on" or "off" impedances to the single balanced to dual unbalanced transformer 110 for the output of the power amplifier or the input of the low noise amplifier. The variable impedance transmission line provides the connection between the active device 160 and the single balanced to dual unbalanced transformer (dual balun) 166. The variable impedance transmission line provides the transmit/receive impedances to the single balanced to dual unbalanced transformer. A direct current bias is applied to the variable impedance transmission line by a radio frequency choke (RFC) 164. The region below the microstrip line is a Schottkey contact on doped active material to provide high conductivity when unbiased. This state in turn presents a low impedance to the single balanced to dual unbalanced transformer which blocks any energy from coupling into the line on an "off" device. When the device is biased "on", the microstrip/active-material junction is reverse biased and the active region is depleted of carriers such that the conductivity below the microstrip is lowered and the impedance is raised. This higher impedance state allows energy to be coupled from the dual balun into the active device.

Accordingly, the reader will see that the single balanced to dual unbalanced transformer provides a final step in the progression of phased array antenna architecture and that this step is made possible by the new single balanced to dual unbalanced transformer. The single balanced to dual unbalanced transformer reduces losses, improves efficiency and ultimately results in a significantly simplified antenna, and reduced cooling and associated power supply costs by up to a factor of five, while still meeting growing antenna performance requirements. The single balanced to dual unbalanced transformer is a new concept that replaces the conventional transmit/receive module architecture for solid state phased array radars. A single balanced to dual unbalanced transformer makes this possible. The single balanced to dual unbalanced transformer is projected to improve radar system sensitivity performance by a factor of four. The single balanced to dual unbalanced transformer provides any, and simultaneous, capability without adding front end losses. The single balanced to dual unbalanced transformer will also improve performance of communication systems.

It is to be understood that the present invention is not limited to the embodiments described above, but encompasses any and all embodiments within the scope of the following claims.

I claim:

1. In a radar having a radiator, a transmitter power amplifier and a receiver low noise amplifier, a balun connected to the radiator;

means for selectively coupling a signal from the transmitter power amplifier to the balun; and means for selectively coupling a signal from the balun to the receiver low noise amplifier.

* * * * *